US008811906B2

(12) United States Patent
Syal et al.

(10) Patent No.: US 8,811,906 B2
(45) Date of Patent: Aug. 19, 2014

(54) APPARATUS AND METHOD FOR MULTI-SIGNAL INTERFERENCE-AVOIDING DATA TRANSMISSION

(75) Inventors: Ashish Syal, Vancouver (CA); Roderick David Earle Filer, Vancouver (CA); Behrouz Pourseyed, Richmond (CA); Steven John Bennett, Coquitlam (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 440 days.

(21) Appl. No.: 13/107,708

(22) Filed: May 13, 2011

(65) Prior Publication Data

US 2012/0289165 A1 Nov. 15, 2012

(51) Int. Cl.
*H04W 16/14* (2009.01)

(52) U.S. Cl.
USPC ......... 455/63.3; 455/93; 455/142; 455/115.1; 455/296

(58) Field of Classification Search
USPC .......... 455/63.3, 63.1, 68, 45, 93, 142, 200.1, 455/186.1, 226.1, 226.2, 226.3, 161.3, 73, 455/67.13, 69, 88, 115.1, 115.3, 135, 140, 455/222; 370/206, 329, 341, 276, 277; 375/344, 216
See application file for complete search history.

(56) References Cited

U.S. PATENT DOCUMENTS

| | | | | |
|---|---|---|---|---|
| 5,164,985 A * | 11/1992 | Nysen et al. | ................ | 380/271 |
| 5,584,051 A * | 12/1996 | Goken | ................ | 455/68 |
| 5,689,440 A * | 11/1997 | Leitch et al. | ................ | 370/313 |
| 6,463,039 B1 * | 10/2002 | Ricci et al. | ................ | 370/277 |
| 6,711,390 B1 * | 3/2004 | Moers | ................ | 455/186.1 |
| 6,957,053 B1 * | 10/2005 | Moers | ................ | 455/186.1 |
| 8,018,830 B2 * | 9/2011 | Hofmann | ................ | 370/206 |
| 2008/0200125 A1 | 8/2008 | Caldwell et al. | | |
| 2008/0233907 A1 | 9/2008 | Ibrahim et al. | | |
| 2009/0141697 A1 * | 6/2009 | Hofmann | ................ | 370/345 |
| 2009/0310803 A1 | 12/2009 | Zhang et al. | | |
| 2009/0311982 A1 | 12/2009 | Zhang et al. | | |
| 2010/0128825 A1 * | 5/2010 | Lindoff et al. | ................ | 375/344 |
| 2010/0201314 A1 * | 8/2010 | Toncich et al. | ................ | 320/108 |
| 2010/0285732 A1 | 11/2010 | Sinton et al. | | |
| 2012/0115421 A1 * | 5/2012 | Wu et al. | ................ | 455/62 |

OTHER PUBLICATIONS

Apple Inc., "Griffin RoadTrip FM Transmitter with SmartScan RDS + Power", <http://store.apple.corm/ca/product/H0692VC/A>, [accessed online] Jun. 20, 2013, 3 pages, Apple Inc., Canada.

(Continued)

*Primary Examiner* — Tan Trinh
(74) *Attorney, Agent, or Firm* — Knobbe, Martens, Olson & Bear, LLP

(57) ABSTRACT

The present technology provides an apparatus and a method for transmitting data via two or more FM signals in an interference avoiding manner. The apparatus comprises at least two FM transmitters. Each FM transmitter is configured to transmit a FM signal on a particular FM channel characterized by a certain carrier frequency that includes data and optionally one or more corresponding alternative frequencies (AFs). The apparatus further includes at least two receivers for receiving incoming electromagnetic radiation (EMR). At least one of the receivers is configured to receive incoming EMR associated with at least one of the FM channels, and another is configured to receive incoming EMR at least at frequencies outside of the FM channels. The controller is configured to separately control activation and deactivation of the FM transmitters and determine the carrier frequencies and the one or more AFs based upon incoming EMR.

17 Claims, 4 Drawing Sheets

(56) References Cited

OTHER PUBLICATIONS

Silicon Labs, "Si47 12/13", <http://www.silabs.com/products/audiovideo/fmtransmitters/Pages/Si471213.aspx>, [accessed online] Aug. 12, 2010, 1 page, Silicon Laboratories Inc.

Silicon Labs, "FM Radio Transmitters", <http://www.silabs.com/products/audiovideo/fmtransmitters/Pages/default.aspx>, [accessed online] Aug. 12, 2010, 2 pages, Silicon Laboratories Inc.

MAEMO.Org - Talk, "FM radio transmitter idea [Archive]", <http://talk.maemo.org/archive/index.php/t-48528.html>, [accessed online] Aug. 12, 2010, 3 pages, Jelsoft Enterprises Ltd.

Belkin, "Belkin TuneCast II Mobile FM Transmitter review - IT Reviews", [accessed online] Jun. 21, 2013, 2 pages, Net Communities Ltd.

Blackberry, "Tune the BlackBerry Visor Mount Speakerphone VM-605 to your vehicle's radio", 2010, 3 pages, Research in Motion Limited.

* cited by examiner

US 8,811,906 B2

APPARATUS AND METHOD FOR MULTI-SIGNAL INTERFERENCE-AVOIDING DATA TRANSMISSION

TECHNICAL FIELD

The present technology pertains in general to data transmitting systems. More particularly the instant technology relates to an apparatus and method for transmitting data via multiple signals selected to avoid signal interference.

BACKGROUND

Mobile electronic devices that are capable of music or video playback have become very popular. Such devices include relatively small special purpose devices designed only for music or video playback via earphones or headphones as well as other, typically mobile devices such as notepads, notebooks or laptops, for example. These devices, irrespective of their size or provision of built-in speaker systems are referred to herein as media players. Media players are often used also in combination with external speaker systems. As many small size media players have been developed that include large amounts of memory capable of storing lots of music, videos and/or games, users have come to use media players as a store for large media libraries. It is therefore convenient to use such a media player as a source of media data not only by itself but also in multiple other use contexts, for example, to interconnect the media player with other devices such as TVs, Hi-Fi systems, other media players or for consumption or sharing the stored media data.

Many media players allow their media to be provided via wired and/or wireless connections for reproduction of better sound quality on external speaker systems, for example. Cable, cradle, adapter or converter connections, however, require additional components and space, incur extra cost, and as such are inconvenient, in many use contexts. They can deprive media players of their mobility aspects and can disadvantageously affect the user experience. Choosing compatible cable connection with compatible plugs from the large variety of plug connectors used today, however, bears risks for connector incompatibilities, nuisance and frustration of users, just to name a few.

A particular use context for a media player often deemed useful is the combination with a vehicle audio system. Some vehicle audio systems provide interconnect systems for connecting external devices via a plug-in type audio jack or Bluetooth™, for example. Large numbers of vehicle audio systems, however, do not provide a plug-in audio jack or Bluetooth™. Vehicle audio systems including a cassette player can be used in combination with cassette converter devices that can convert audio input signals from a media player and provide the audio to the vehicle audio system via the cassette deck. Although they have been available for many years, cassette converter devices suffer from unreliable operation, are bulky, fragile, and rely on typically no longer used technology. Furthermore, the number of vehicle audio systems providing a cassette deck is diminishing.

Ever since broadcast activities within licensed spectra has been legalized and regulated for restricted uses in certain jurisdictions, short-range radio transmitter devices have been made available that can transmit signals to a vehicle audio system via radio signals. Depending on the jurisdiction, transmissions from such radio transmitters may be limited in power or entirely prohibited at frequencies that are used by a licensed broadcaster, for example.

Typical short-range radio transmitter devices are either external to or integrated in a media player. They broadcast low-power radio signals and typically employ frequency modulation (FM) for better sound quality rather than amplitude modulation (AM). Radio transmitters used today are typically referred to as FM transmitters and many of them simply transmit on a fixed frequency or frequency that can be manually set by a user. As such, playing music through a car radio requires manually setting the corresponding transmission frequency of the radio transmitter and the radio receiver of the vehicle audio system. The amount of attention required by a user for this purposes is typically considered inconvenient. Some jurisdictions consider this a safety hazard and prohibit interaction of a driver with such devices.

More recently, mobile radio transmitters have been developed that aim at providing improved comfort for a user by automatically, at least partially, assisting the setup and maintenance of an operative interconnection with a vehicle audio system. Such transmitters can also reduce the amount of interference between radio signals generated by a radio transmitter and radio signals from other sources. Solutions aim at reducing the amount of intervention required by a user to avoid interference by automating various parts of the frequency selection so the user does not have to perform a manual search for free frequencies before setting a frequency for a transmission in order to avoid signal interference and achieve a high quality transmission, for example. This is particularly relevant when initializing a radio transmission or when interference conditions change due to roaming of the radio transmitter during an active radio transmission while driving, for example. For this purpose, some FM transmitters employ an "Alternative Frequency" function (AF) of the Radio Data System (RDS) or, in North America typically referred to as the Radio Broadcast Data System (RBDS), herein collectively referred to as RDS. The AF function enables a suitably configured radio receiver to follow a broadcast signal by switching to an alternative frequency depending on the signal quality. For this purpose, the broadcast signal must include information about the alternative frequencies. RDS/RDBS can encode such information in a sideband of a FM signal. U.S. Patent Application Publication Nos. 2010/0285732 and 2008/0200125 provide examples of AF-based FM transmitters.

Therefore there is a need for a solution that overcomes at least one of the deficiencies in the art.

This background information is provided to reveal information believed by the applicant to be of possible relevance to the present technology. No admission is necessarily intended, nor should be construed, that any of the preceding information constitutes prior art against the present technology.

SUMMARY

An object of the present technology is to provide an apparatus and method for multi-signal interference avoiding data transmission. In accordance with one aspect of the present technology, there is provided an apparatus for transmitting data via frequency modulation (FM) of electromagnetic radiation; the apparatus comprising: a first FM transmitter configured to transmit a first FM signal on a first FM channel characterized by a first carrier frequency, the first FM signal including the data and optionally an indication of one or more first alternative frequencies (AFs); a second FM transmitter configured to transmit a second FM signal on a second FM channel characterized by a second carrier frequency, the second FM signal including the data and optionally an indication of one or more second AFs; a first receiver configured to receive incoming electromagnetic radiation associated with at least one of the first FM channel and the second FM channel; a second receiver configured to receive incoming electromagnetic radiation at least at one or more frequencies outside of the first FM channel and the second FM channel; and a controller operatively connected with the first FM transmitter, the second FM transmitter, the first receiver and the second receiver, the controller configured to determine the first carrier frequency and the second carrier frequency based upon incoming electromagnetic radiation; the controller further configured to separately control activation and deactivation of the first FM transmitter and the second FM transmitter.

In accordance with another aspect of the present technology, there is provided a method for transmitting data via frequency modulation (FM) of electromagnetic radiation; the method comprising: providing at least one of a first FM signal and a second FM signal, the first FM signal associated with a first FM channel characterized by a first carrier frequency, the first FM signal including the data and optionally an indication one or more first alternative frequencies (AFs); the second FM signal associated with a second FM channel characterized by a second carrier frequency, the second FM signal including the data and optionally an indication of one or more second AFs; receiving incoming electromagnetic radiation associated with at least one of the first FM channel and the second FM channel; receiving incoming electromagnetic radiation at least at one or more frequencies outside of the first FM channel and the second FM channel; determining the first carrier frequency and the second carrier frequency based upon incoming electromagnetic radiation; and separately controlling activation and deactivation of the first FM transmitter and the second FM transmitter.

In accordance with another aspect of the present technology, there is provided a computer program product comprising a memory having computer readable code embodied therein, for execution by a CPU, for performing a method for transmitting data via frequency modulation (FM) of electromagnetic radiation; the method comprising: providing at least one of a first FM signal and a second FM signal, the first FM signal associated with a first FM channel characterized by a first carrier frequency, the first FM signal including the data and optionally an indication one or more first alternative frequencies (AFs); the second FM signal associated with a second FM channel characterized by a second carrier frequency, the second FM signal including the data and optionally an indication of one or more second AFs; receiving incoming electromagnetic radiation associated with at least one of the first FM channel and the second FM channel; receiving incoming electromagnetic radiation at least at one or more frequencies outside of the first FM channel and the second FM channel; determining the first carrier frequency and the second carrier frequency based upon incoming electromagnetic radiation; and separately controlling activation and deactivation of the first FM transmitter and the second FM transmitter.

DETAILED DESCRIPTION OF THE EMBODIMENTS

Definitions

Figure 1:
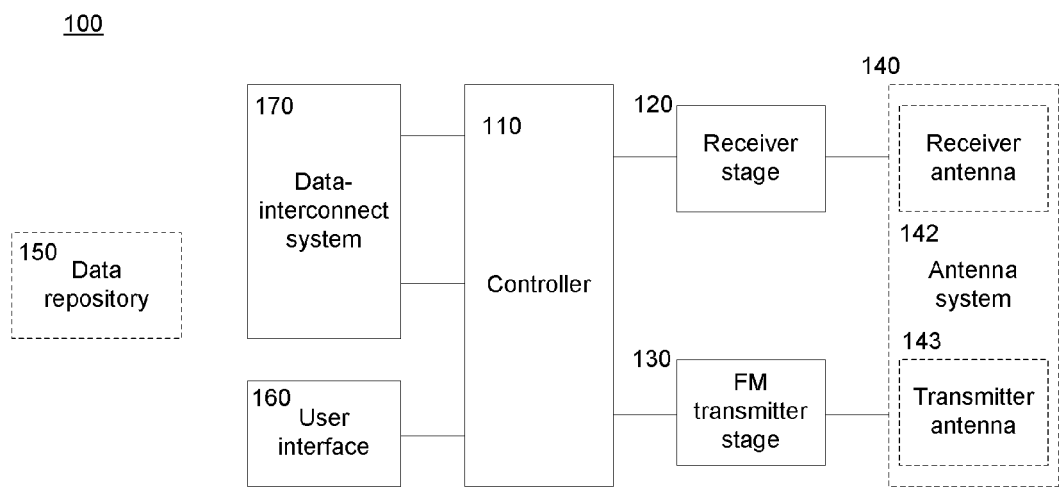
FIG. 1 illustrates a block diagram of a FM transmitter system according to embodiments of the present technology.

As used herein, the term "about" refers to a +/−10% variation from the nominal value. It is to be understood that such a variation is always included in a given value provided herein, whether or not it is specifically referred to.

As used herein, the term "data" refers to audio, video, or meta-data associated with audio and/or video data, or other data, as the case may be.

Unless defined otherwise, all technical and scientific terms used herein have the same meaning as commonly understood by one of ordinary skill in the art to which this technology belongs.

The present technology provides an apparatus and method for transmitting data via one or more frequency modulated (FM) radio signals, in short referred to as FM signals, intended for receipt by a suitable external receiver, which can follow changes in carrier frequency of one or more corresponding transmitted FM signals. Each FM signal is transmitted on a particular FM channel associated with the corresponding carrier frequency. Each FM signal may further include information about one or more alternative (carrier) frequencies for which one or more corresponding FM signals may be transmitted that also include the data.

The present technology provides an apparatus and a method for transmitting data via two or more FM signals in an interference avoiding manner. The apparatus comprises at least two FM transmitters. Each FM transmitter is configured to transmit a FM signal on a particular FM channel characterized by a certain carrier frequency that includes data and optionally one or more corresponding alternative frequencies (AFs). The apparatus further includes at least two receivers for receiving incoming electromagnetic radiation (EMR). At least one of the receivers is configured to receive incoming EMR associated with at least one of the FM channels, and another is configured to receive incoming EMR at least at frequencies outside of the FM channels. The controller is configured to separately control activation and deactivation of the FM transmitters and determine the carrier frequencies and the one or more AFs based upon incoming EMR. In some embodiments, the controller is configured to separately control the re-tuning of the FM transmitters.

The present technology can mitigate interference caused by incoming electromagnetic radiation (EMR) and further the risk for user intervention once an operative transmission with the external receiver has been established. To aid in this purpose, the present technology can simultaneously determine interference with actually transmitted FM signals as well as determine FM channels for transmission of FM signal at alternative frequencies. External receivers can include vehicle audio or other audio and/or or video systems such as FM radios, or other devices, for example. Apparatus according to embodiments of the present technology are herein referred to as FM transmitter systems.

According to embodiments of the present technology, information about alternative frequencies is provided via the alternative frequency (AF) function provided by RDS/RDBS or in other ways, for example. RDS/RDBS is often employed in terrestrial radio receivers of vehicle audio systems, but can be provided by non-vehicle audio systems. FM transmitter systems according to embodiments of the present technology can be used with little user effort in combination with RDS/RDBS radio receivers that support the AF function. As further described herein and depending on the embodiment, a FM transmitter system may be configured to employ a user-interactive mode that permits a user to use the FM transmitter system in combination with FM radio receivers that do not support the AF function or no RDS/RDBS.

A FM transmitter system according to embodiments of the present technology can be configured as a device for integral inclusion in a media player, or as a standalone apparatus for operative interconnection with a media player. According to embodiments, a FM transmitter system may be configured to receive data via a wired and/or wireless data interconnect system, for example a suitable audio/video cable, infrared, Bluetooth™ and/or other interconnect system. Depending on the embodiment, a FM transmitter system can include an antenna system and/or be configured for operative coupling with an external antenna system. Depending on the embodiment, an external antenna system may be configured in a modular fashion, for example as a part of a cradle for operatively disposing the FM transmitter and/or the media player. Embodiments of the present technology relate to short-range and low-power FM transmission, for example for an in-vehicle environment. Such FM transmission typically occurs without requirement for a radio operating license.

According to embodiments, interference between FM signals provided by the FM transmitter system and incoming EMR, referring to EMR originating from devices other than the FM transmitter system or its environment, can be mitigated when carrier frequencies and/or alternative frequencies of the FM signals are properly determined so that certain frequency ranges, also referred to as FM channels, which are associated with incoming EMR are avoided for transmission from the FM transmitter system. For example, if one or more components of the electromagnetic field of the incoming EMR have or are deemed to have strengths beyond a predetermined threshold. Depending on the embodiment, the FM transmitter system may be configured to determine and distinguish between FM signals which originate from the FM transmitter system and other devices and distinguish such from other incoming EMR associated with noise or other non-FM signals, for example.

According to embodiments, actual or deemed incoming EMR can be determined based on measurements of electromagnetic field strengths and/or associated power at certain frequencies, also referred to as spectral analysis, or by inferring certain EMR from geographical or previously acquired incoming EMR records kept in a suitable memory in the FM transmitter system, for example, information about carrier frequencies used by radio stations within certain geographical regions based on the location of the FM transmitter system and an external radio receiver. Depending on the embodiment, EMR records may be preconfigured, expansible, downloadable or otherwise obtained and/or maintained by a FM transmitter system.

According to some embodiments, the FM transmitter system is configured to manipulate one or more aspects of one or more FM signals in order to stimulate an external receiver to switch to a particular FM signal provided by the FM transmitter system.

FM Transmitter System

FIG. 1 illustrates a block diagram of a FM transmitter system 100 according to embodiments of the present technology. The FM transmitter system 100 comprises at least a FM transmitter stage 130, a receiver stage 120 and a controller 110. The FM transmitter stage 130 comprises two or more FM transmitters (not illustrated) for providing one or more FM signals on one or more FM channels. The receiver stage 120 comprises two or more receivers (not illustrated) for receiving electromagnetic radiation at one or more frequencies. The FM transmitter system 100 further comprises a data interconnect system 170 and a user interface 160. The controller 110 is configured to control operation of the FM transmitter system 100. The controller 110 is operatively connected with at least the receiver stage 120, the FM transmitter stage 130, the data interconnect system 170, and the user interface 160.

Depending on the embodiment, an antenna system 140 is provided, which may form an integral part of or be configured as an external module and operatively attachable to the FM transmitter system 100. Furthermore, a data repository 150 is provided, which may form an integral part of or be configured as an external module and operatively attachable to the FM transmitter system 100. Moreover, the FM transmitter system 100 may be configured for operative coupling with an external media player (not illustrated).

According to embodiments, the FM transmitter system 100 comprises or is configured for operative coupling with a global positioning system (GPS) which may be assisted via cellular phone networks, or other terrestrial data and/or communication systems, for example.

Depending on the embodiment, the FM transmitter system 100 may further comprise (not illustrated) an internal and/or external power source. Power may be provided via one or more internal or external batteries, an internal or external power supply which may accept a range of AC line voltage at fixed or varying frequency and/or DC voltage, for example from a 12 V DC vehicle outlet. Depending on the embodiment, the FM transmitter system 100 may be configured to include one or more batteries, be configured for operative coupling with an external power source, or both. The FM transmitter system 100 may be configured to enable charging of an internal power source during operation of the FM transmitter system 100.

According to embodiments, one or more components of the FM transmitter system 100 may be implemented in hardware, firmware and/or software, or a combination thereof. One or more of the FM transmitter system components may be configured to process data in a digital, analog or mixed digital-analog format. The FM transmitter system or one or more of its components may be implemented in one or more operatively interconnected, integrally formed devices.

FM Transmitter Stage

According to embodiments, the FM transmitter stage 130 comprises two or more FM transmitters. Depending on the embodiment the FM transmitters of the FM transmitter system 100 may be configured as separate components or integrally formed within one device, for example. Each FM transmitter is operatively controllable by the controller 110. For example, transmission of a FM signal by a FM transmitter may be independently/separately activated or deactivated from that of another FM transmitter.

According to embodiments, each of the two or more FM transmitters is configured to generate and provide an FM signal including data for transmission at a corresponding carrier frequency. Each carrier frequency is independently controllable of the other carrier frequencies. Depending on the embodiment, each of the FM transmitters is configured to provide an FM signal including one or more alternative frequencies. The FM transmitters are configured to allow control of the carrier frequencies by the controller 110. Depending on the embodiment, the FM transmitters may be configured to allow control of one or more aspects associated with FM channels including the width and/or FM channel spacing, for example.

According to embodiments, the data may be provided to the FM transmitter stage 130 by or under the control of the controller 110, which may control flow of data from the data repository 150 via the data interconnect system 170. The FM transmitter stage 130 is further configured to receive and process the information about alternative frequencies from the controller 110. According to some embodiments, the FM transmitter stage 130 is configured to receive and include metadata in FM signals. Metadata may include information about one or more aspects associated with audio and/or video data that is to be transmitted. Metadata may include song titles or other information, for example.

According to embodiments, the FM transmitter stage 130 is operatively coupled with the antenna system 140. Depending on the embodiment, the FM transmitters may be configured for operative coupling with one or more antennas for transmission. One or more such antennas may be shared with the receiver stage 120 and as such may be used for both transmission of FM signals and reception of EMR.

According to embodiments, each FM transmitter is configured to allow control of its carrier frequency independently/separately from the carrier frequencies of other FM transmitters. Depending on the embodiment, other aspects of a particular FM signal provided by a FM transmitter including bandwidth, transmit power or other aspects characterizing the corresponding FM signal or the FM transmitter may be predetermined or controllable by the controller 110. One or more such aspects may be predetermined or controlled by the controller in order to facilitate operation and/or compliance with broadcast regulations, which may vary depending on jurisdiction. Other aspects may include the form of encoding of alternative frequencies. Specific aspects potentially affecting the configuration of specific embodiments may include different FM channel spacing such as 100 kHz in Europe and 200 kHz in North America, as well as differences in AF sideband encoding between RDS/RDBS between Europe and North America or other aspects.

According to some embodiments, the FM transmitter system 100 may be configured to determine FM channel bandwidths and spacing based upon scans or information associated with the geographical location of the FM transmitter system 100, for example. For this purpose and as further described herein, the FM transmitter system 100 may include a geographical localization system, for example.

According to embodiments, the FM transmitter stage 130 is configured for submitting alternative frequencies via RDS/RDBS. As such the FM transmitters are configured to support an AF RDS/RDBS function. Depending on the embodiment, the FM transmitter stage 130 may be configured to support further or a complete set of RDS/RDBS functions as described herein.

Receiver Stage

The receiver stage 120 is provided to aid in determining certain EMR at one or more frequencies associated with incoming EMR. EMR may be measured in terms of the strength of received EMR associated with a spectral power distribution across a predetermined bandwidth or FM channel. Accordingly, the receiver stage 120 may be preconfigured or controlled by the controller 110 to perform scans of certain EMR at certain frequencies or to sweep scan across predetermined frequency ranges within one or more FM channels, for example. For this purpose and according to embodiments, the receiver stage 120 is operatively coupled with the antenna system 140 for receiving EMR.

Depending on the embodiment, the receiver stage 120 comprises two or more receivers. Multiple receivers may be employed for concurrent scanning and/or determination of received EMR associated with different FM channels, FM signals and/or certain frequencies. The two or more receivers may be configured differently and/or operated in different operational modes. Depending on the embodiment, one or more of the receivers may be operated continuously, intermittently or otherwise, depending on the function they are sought to perform and/or an instant operational mode, which may be determined by the controller 110.

According to embodiments, the receiver stage 120 is operatively coupled with the controller 110 for control of the receiver stage 120 and its two or more receivers and for optional processing of signals provided by the two or more receivers. According to some embodiments, the receiver stage is configured to separate received EMR into incoming EMR and EMR originating from transmissions of the FM transmitter system 100 itself Depending on the embodiment, the receiver stage 120 may be configured to determine if one or more signal characteristics associated with licensed or other known FM broadcasts are present in incoming EMR. For example, the receiver stage 120 may be configured to provide functions such as scanning for, filtering and/or determining stereo beacon signal, certain sideband signals such as those used for providing RDS/RDBS data including AF, clock time, program identification, program service, radio text or other RDS/RDBS data, or other information, for example. Depending on the embodiment, some or all of these functions may be performed in combination with controller 110. Such information may be determined and/or forwarded to the controller 110 and used to indicate deemed occupancy of FM channels without actually scanning for received EMR of corresponding channels, for example.

According to some embodiments, one or more of the receivers may be operated to scan for EMR within a FM channel or at one or more carrier frequencies associated with the one or more FM transmitters of the FM transmitter system. In addition and/or alternatively, one or more of the receivers may be configured and/or operated to scan for EMR within one or more predetermined frequency bands.

According to an embodiment, the receiver stage 120 comprises two receivers, one for receiving and/or scanning for EMR within at least a portion of one of the FM channels used by the FM transmitter stage 130 and another receiver for receiving and/or scanning for EMR associated with one or more frequencies outside of the FM channels used by the FM transmitters.

Antenna System

According to embodiments, the antenna system 140 comprises one or more antennas. For example, the antenna system may comprise one antenna used for both reception of EMR and transmission of FM signals or comprise one or more transmitter antennas 143 and one or more receiver antennas 142. The antenna system 140 may comprise one or more receiver antennas 142 and/or one or more of the transmitter antennas 143. The antenna system may comprise one or more antennas than are used for both reception and transmission purposes.

Depending on the embodiment, the antenna system 140 may be considered an internal or external component of the FM transmitter system 110. As such, the antenna system 140 may be configured for integral or releasable operative coupling with the receiver stage 120 and/or the FM transmitter stage 130. The antenna system 140 may further be operatively coupled (not illustrated) with the controller 110, in which case the controller 110 may be configured to control one or more aspects of the antenna system 140 or other components of the FM transmitter system 110. For example, the controller 110 may prohibit one or more components from providing drive signals to one or more antennas via certain interfaces with the antenna system 140 and/or other components when the antenna system is not operatively coupled to the FM transmitter system. For this purpose, the FM transmitter system 100 may comprise a detector for indicating an operative connection with the antenna system 140. An external antenna system may be configured as a cradle or other external device.

In some embodiments of the present technology, one or more of the transmitters of the antenna system are positioned at a remote location relative to the other components of the apparatus. In these embodiments, the apparatus further comprises a wireless connection module configured for operative communication with the remotely positioned one or more transmitters.

Controller

The controller 110 is operatively coupled with a number of components of the FM transmitter system 100 for control, receipt, transmission or other aspects regarding the flow of signals and/or data in order to enable adequate system operation. The controller 110 is configured to control the flow of data from the data repository 150 via the data interconnect system 170 to the FM transmitters based upon user input received via the user interface 160. In addition, the controller 110 is configured to determine user interface output and control its provision to a user via the user interface.

According to embodiments, the controller 110 is configured to control the operation of the FM transmitter stage 130 and selectively activate or deactivate FM transmitters and/or FM signals provided thereby based upon information about certain EMR. For this purpose the controller 110 is operatively coupled with the receiver stage 120. According to embodiments, the controller 110 is configured to determine one or more available carrier frequencies and available alternative frequencies, in short referred to as available frequencies that are substantially free from interference, that is, the corresponding interference is below a certain threshold. Available frequencies may be determined upon occurrence of one or more events as described herein.

Depending on the embodiment, the controller 110 may be configured to control operational conditions of one or more components of the FM transmitter system 100 depending on the condition of an operative connection with the antenna system 140 and/or the data repository 150. This may be relevant for embodiments of the FM transmitter system 100 in which the antenna system 140 and/or the data repository 150 are configured as separate modular components or devices, for example, when at least parts of the antenna system are formed within a cradle for holding the data repository, or it is provided by an external media player connected via the data interconnect system 170.

Determination of Available Frequencies and Interference

According to embodiments, the FM transmitter system 100 determines one or more available carrier frequencies for establishing an initial transmission, for example upon energization, reset or other event. Depending on the embodiment, once an available carrier frequency has been determined, the FM transmitter system may activate data transmission on a corresponding FM channel without or subject to determining further available carrier or alternative frequencies. Once a transmission of a FM signal has been activated, the FM transmitter system 100 begins to monitor (using one or more receivers, for example) the corresponding FM channel for interference and also monitors (using one or more other receivers, for example) other FM channels to maintain information about their availability and/or occupancy. Depending on the embodiment, such information may be utilized by the FM transmitter system in one or more ways in order to activate, deactivate, transition and/or maintain transmission of one or more FM signal transmissions as described herein.

According to embodiments, in order to determine available carrier and/or alternative frequencies it may need to be determined which portion of received EMR is substantially considered incoming EMR that is associated with sources other than the FM transmitter system 100. As such it may be determined which portion of the received EMR can be considered originating from the FM transmitter system, for example. Depending on the embodiment, a separation of received EMR may be performed in order to determine interference and/or available carrier frequencies and available alternative frequencies. Available frequencies as well as interference may be determined, for example per FM channel. FM channel definitions associated with FM radio broadcast signals are specified by regulatory bodies and may be in effect within certain geographical regions. Nominal width of a FM channel within which a FM signals may be transmitted and the nominal center frequency spacing of adjacent FM channels is typically 100 kHz for use in Europe or 200 kHz for use in North America, for example. According to embodiments, a FM transmitter system is configured to provide FM signals only in FM channels within certain ranges of the electromagnetic spectrum, for example between 87.5 MHz and 108.0 MHz in North America.

According to some embodiments, interference can be determined at certain times in order to facilitate high quality transmissions. For example, during initial determination of a carrier frequency as well as during active FM transmissions from the FM transmitter system. For this purpose, received EMR may be determined periodically, intermittently or at other times. Interference may be determined in one or more ways as described herein. For this purpose, an active transmission may be shifted to another carrier frequency or FM channels proximate to a FM channel that is used by the FM transmitter system for transmission may be tested for interference and/or incoming EMR.

According to some embodiments, the controller 110 is configured to scan for EMR and determine availability and/or unavailability of FM channels. Such scans may be performed upon occurrence of certain events, for example intermittently, repeatedly, periodically, upon expiry of certain times, or upon activation of the FM transmitter system 100 or other events. As such, the controller 110 may be configured to update a white and/or black list of FM channels based upon outcomes of one or more EMR scans. For example, entries in the black and/or white list may be updated in effect of the results of just one scan or dependent on the results of one or more other scans or other events, for example. Depending on the embodiment, an entry in a black and/or white list may be set to expire after or be good only for a certain time, for example.

According to some embodiments, the controller 110 determines available FM channels in combination with the receiver stage 120 by scanning for EMR between, for example 87.5 MHz and 108 MHz. Depending on the embodiment, the controller 110 may then short list FM channels associated with limited or no EMR into a list of available FM channels. The controller 110 may short list an available FM channel if the EMR associated with it is below a certain threshold, for example. Depending on the embodiment, such a threshold may be predetermined or determined based upon analysis of instant or recorded information about incoming EMR, for example per FM channel, which may be stored in corresponding EMR records. For this purpose the controller 110 may read and/or record certain aspects of incoming EMR in a suitable memory. EMR records may include or be configured as lists of available or unavailable/occupied FM channels, also referred to as white lists and black lists, respectively. Depending on the embodiment, the FM transmitter system may maintain one or more white and/or black lists. One or more white and/or black lists may be associated with one or more particular geographical regions or time frames, for example. Depending on the embodiment, the controller 110 may rank available FM channels by corresponding incoming EMR and then chose at one or more available FM channels for transmission.

According to some embodiments, the controller 110 is configured to control and/or configure the two or more receivers of the receiver stage 120. Each receiver may be configured to scan for EMR within one or more FM channels associated with one or more carrier frequencies. Scans may be performed within FM channels not used by the FM transmitter system and/or within a FM channel that is actively used for transmission of FM signals from the FM transmitter system. As such transmissions from the FM transmitter system may be picked up by the receiver stage 120. As noted herein, for purposes of determining potential interference a distinction may need to be made between incoming EMR from sources other than the FM transmitter system 100 and received EMR from all sources including the FM transmitter system 100. Depending on the embodiment, such a separation may be accomplished and the incoming EMR determined in one or more ways.

According to some embodiments, one or more receivers of the receiver stage 120 are configured to determine a total power density per FM channel and provide information about same to the controller 110. Provided proper calibration, the controller 110 can subtract the total power density for a particular FM channel from the total transmit power for that FM channel and so estimate the total power density per FM channel due to incoming EMR. A proper calibration may be pre-configured, and/or determined by periodically attenuating the transmit power and quantifying the corresponding effect via phase-locking or other suitable technique. Furthermore, the receiver stage 120 may be configured to receive substantially the same data provided to the FM transmitters and to determine a difference signal between the received EMR and the incoming EMR at the FM signal level based upon the provided data. The receivers may thus, in some embodiments, measure incoming EMR not due to the associated FM transmitters, even without interrupting transmission of the FM transmitters.

According to some embodiments, interference may be determined based upon the strength of incoming EMR versus that of received EMR, which may be estimated by determining received EMR during intermissions of FM signals from the FM transmitter system that have a suitable duration, for example during an opportune break in the audio transmission such as a silent or quiet period, or a period of low volume, or a pause in an audio transmission, or the like. The FM transmitter may be configured to cease output of EMR during such periods, thereby providing intermissions which facilitate measurement of other EMR without presence of the FM signals of the FM transmitter. Similarly and according to some embodiments, a carrier frequency used for an active transmission may be altered to free up, that is to enable, the corresponding FM channel for interference testing for one or more particular tests.

In some embodiments, audio may be passed through a delay buffer before it is provided for transmission by the FM transmitter. The audio may be analyzed before or as it enters the delay buffer to detect opportune breaks in the audio transmission such as silent periods, quiet periods, periods of low volume, pauses in the audio transmission, and the like. The opportune breaks are such that interruption to the audio during these periods has less impact to a listener than interruption to the audio during other periods. As such analysis takes a nonzero amount of time, the delay buffer may be configured such that the audio can be adequately analyzed and appropriate action, such as intermission of the FM transmitter, can be initiated in time to take advantage of opportune breaks in the buffered version of the audio as they occur.

In some embodiments, when the audio is saved in memory and an apparatus of the present technology has access to said memory, the audio data may be pre-analyzed for occurrence of the above-described opportune break in the audio transmission. Pre-analysis may occur before playback of the audio data, for example when the audio data is first loaded, while other audio data is being played back, or during idle times. Pre-analysis may result in data indicative of timing of the opportune breaks in the audio transmission, and this data may be used to trigger appropriate actions, such as intermission of the FM transmitter for measurement or other purposes.

In some embodiments, another appropriate action which can be taken during opportune breaks in the audio transmission, as described above, is manipulating the FM signal to provide an incentive or stimulation to an external FM receiver to tune to another FM channel. Specific ways for adequately manipulating the FM signal are described elsewhere herein. If the external FM receiver is expected to react quickly enough, manipulation of the FM signal can begin during the opportune break. If the external FM receiver is expected to react more slowly, and the manipulation does not unacceptably degrade the data carried by the FM signal, then said manipulation can begin prior to the opportune time, so that the external FM receiver is expected to tune to the other FM channel during the opportune time. This can be advantageous for some external FM receivers that cannot tune between channels without noticeable interruption in the audio playback, since the tuning can be triggered to occur during the opportune breaks.

According to some embodiments, interference with EMR may be inferred by assessing the quality of an audio transmission via a microphone system operatively coupled to or included in the FM transmitter system 100, for example a microphone or microphone array, and the audio received via the microphone system compared with the intended audio determined internally by the FM transmitter system and based upon the data previously transmitted. This process may be employed to provide a general assessment of the quality of transmitted audio and be used to determine other carrier frequencies in an attempt to improve transmission quality.

According to some embodiments, data reconstructed based on signals received by the receiver stage 120 may be compared against previously transmitted and, if necessary, properly time shifted data to account for delays due to signal propagation, and differences may be used to determine potential interference between an FM transmission and incoming EMR. Depending on the embodiment, the controller 110 may be configured to provide one or more of the noted or similar functions.

According to some embodiments, the transmitted FM signal, received by a receiver may be demodulated, optionally including stereo components, RDS data subcarrier components, other sideband components, or the like. At least a portion of the demodulated signal may be compared with the audio source as it is provided to the FM transmitter to detect degradation in quality due to interference from outside EMR interference. In some embodiments, data such as the RDS data and/or stereo data may be analyzed with respect to quality, for example by measuring a data error rate upon comparison of the receiver data to the corresponding original signal provided to the FM transmitter.

According to an embodiment, FM channels may be identified as available that are characterized by the least incoming EMR or that are at least a predetermined distance of available FM channels separated from an occupied FM channel. Depending on the embodiment, if at least one available FM channel cannot be determined, the controller 110 may set one or more predetermined actions. For example, the controller 110 may submit a suitable notification via the user interface 160 seeking to inform the user about the instant condition, prohibit activation of the FM transmitters or set one or more other actions.

According to some embodiments, EMR records may be updated and/or one or more predetermined actions set depending on correlations between occurrences of two or more events. For example, the controller 110 may be configured to not update or delay updating a black listed FM channel even if it appears to have become available based on a corresponding scan for EMR, for as long as its availability has not been indicated for at least a certain amount of time, and/or power is withdrawn from the FM transmitter system or the FM transmitter system stops moving. Such a correlation of events may indicate only temporary or location-based availability of the particular FM channel, for example, when the FM transmitter system passes through a tunnel or is located within a building during parking.

According to some embodiments, the controller 110 is configured to utilize EMR records to assist in the determination of deemed availability and/or occupancy of FM channels. Depending on the embodiment, EMR records can include information about incoming EMR associated with one or more FM channels. EMR records may be associated with certain geographical locations, time or other aspects, for example. For this purpose geographical position information indicating the position of the FM transmitter system 100 may be provided from an internal or external GPS device to the controller 110 for corresponding processing. The controller 110 may be configured to generate and/or update corresponding EMR records.

According to some embodiments, the controller 110 is configured to keep records of correlations between occurrences of two or more events, analyze and/or adaptively learn one or more correlations. Records about correlations and one or more EMR records may be retained in a suitable memory for use by the FM transmitter system 100. Depending on the embodiment, the FM transmitter system 100 may be configured to utilize such and other records including preconfigured EMR records to speed up determination of available FM channels upon energization or during other redetermination of available/occupied FM channels, for example.

Depending on the embodiment, the controller 110 may be configured to obtain EMR records from memory included within the FM transmitter system 100 and/or obtained from an external memory, for example via a suitable interconnect system or network connection. For this purpose the FM transmitter system 100 may include or be configured for operative coupling with an internal or external modem to establish a network connection (not illustrated). Such a modem may be provided by a media player or the FM transmitter system 100 may form part of a media player, for example.

According to some embodiments, the controller 110 is configured to avoid scanning for EMR within certain FM channels identified by one or more EMR records. For example, if an EMR record indicates that a particular FM radio broadcaster utilizes a particular FM channel, the controller may avoid scanning the FM channel in order to attempt to shorten the time it takes to determine available FM channels. Depending on the embodiment, EMR records may be preconfigured within the FM transmitter during manufacture or otherwise, acquired during operation based upon measurements performed by the FM transmitter or by downloading from one or more external sources of EMR records via a modem or other network interconnect system from a remote EMR records repository, external device, other FM transmitter system, media player or other device, for example.

According to some embodiments, the controller 110 is configured to control at least some RDS/RDBS signalling for purposes of communication of alternative frequencies via FM signals. For this purpose the two or more FM transmitters included in the FM transmitter system 100 need to be adequately configured to support this function. Depending on the embodiment, an RDS/RDBS AF function, subset of RDS/RDBS functions including AF, or a complete set of RDS/RDBS functions may be supported by the FM transmitter system 100. Depending on the embodiment, the controller 110 may be limited to determination and/or provision of RDS/RDBS data to the two or more FM transmitters while leaving the encoding of RDS/RDBS data in the FM signals to the FM transmitters, for example.

According to some embodiments, communication of carrier and/or alternative frequencies for set up of an operative transmission of data between the FM transmitter system and a suitable FM radio receiver can be accomplished via audio and/or visual output via the user interface. This function may furthermore help re-establish a lost operative communication with an external FM radio receiver that failed to automatically follow changes of a carrier frequency indicated via RDS/RDBS, or that does not support RDS/RDBS at all.

Data Interconnect System and Data Repository

According to embodiments, the data interconnect system 170 provides an interface for operative interconnection between the data repository 150 and the controller 110. The data interconnect system may provide one or more permanent or modularly connectable wired, or wireless interfaces. The data repository 150 provides data for transmission via the two or more FM signals generated by the FM transmitters of the FM transmitter stage. Depending on the embodiment, data may be provided from the data repository 150 via the data interconnect system 170 to the FM transmitter stage 130 directly (not illustrated) or via the controller 110. As such and depending on the embodiment, the controller 110 may be configured to control the forwarding of the data or forward the data itself from the data repository to the FM transmitters.

According to embodiments, the data repository is configured as a digital read/write memory. Data may be stored in the memory in one or more digital formats, for example, in an audio or video format such as MP3, AAC, MA4, OGG, FLAC, AVI, MPG, FLV or other format, in which data may be encoded in a compressed or uncompressed, lossless or lossy manner. Data may further be encrypted in one or more ways and/or be subject to digital rights management measurements. As such data may need to be decoded and/or decrypted, for example, by the controller 110, before it can be forwarded to the FM transmitters of the FM transmitter stage 130.

According to some embodiments, the data interconnect system 170 includes one or more external interfaces for operatively coupling to the FM transmitter system 100 one or more external devices (not illustrated) including, for example, one or more media players, irrespective of whether a data repository 150 is part of the FM transmitter system 100. Accordingly, the FM transmitter system 100 may form part of or be configured as a media player and may be configured to support operative interconnection with other media players.

Depending on the embodiment, the data interconnect system 170 may include one or more unidirectional or bidirectional interfaces to the data repository 150. As such the data interconnect system 170 and/or the controller 110 may be configured to support some form of data flow control including selection of data from the data repository based upon user input received via the user interface 160, or substantially passively receive data based upon provision from, for example, an external media player. The signals received at the data interconnect system 170 that include the data from the data repository 150 may be processed by the data interconnect system 170, the controller 110, or another component in one or more predetermined ways, for example, the data and/or the signals may be analyzed, converted, compressed, decoded, encoded, decrypted, encrypted, digitized or otherwise processed. For example, one or more interfaces of the data interconnect system 170 may be monitored for actual receipt of data and/or an amount of noise present therein.

User Interface

According to embodiments, the user interface 160 provides functions enabling the user to control certain aspects of the operation, including activation and deactivation, of one or more function of the FM transmitter system 110. Depending on the embodiment, the user interface 160 may provide audio, visual or tactile interaction between a user and the FM transmitter system 100. For example, the user interface may include one or more pushbuttons, sliders, displays, speakers, microphones, touch screens or other user interface components. The user interface may be operatively controlled and/or provided via a remote user interface external to the FM transmitter system 100, for example via Bluetooth™ or another network protocol from a suitably configured console included in a vehicle, a remote control, media player or other external device, for example.

According to some embodiments, the user interface 160 is configured to provide and/or allow inputting information for example about carrier frequencies or FM channels, for purposes of informing or allowing various levels of interactive control by a user. Such functions may be used to enable a user to manually set or override carrier frequencies or FM channels used for FM signal transmissions, for example.

In some embodiments, the user interface may output an audible or visible instruction to tune a remote FM receiver to a predetermined frequency of the FM transmitter to receive the FM signal. In some embodiments, an audible instruction to tune the remote FM receiver to a specified frequency may be transmitted in the FM signal, so that it is audible through the remote FM receiver.

Activation, Deactivation, Transition and Manipulation of FM Signals

According to embodiments, FM signals may be activated, deactivated, transitioned and/or manipulated in one or more ways. For example, a FM signal may be activated by increasing transmission power in a predetermined manner up to a certain power level, for example gradually, suddenly or abruptly with or without overshoot of a predetermined or otherwise determined power level. A FM signal may be deactivated in a like manner. Depending on the embodiment, one or more of activation, deactivation and/or transitions of FM signals as well as power levels associated with an active and/or inactive transmission, may be performed and/or determined differently, depending on how many FM signals are to be correspondingly affected at a time.

Depending on the embodiment, transitions between carrier frequencies may be performed in one or more ways, for example, in a predetermined manner or depending on actual interference, other conditions imposed by incoming EMR, actual availability and/or previous transmission of alternative frequencies, or other conditions. According to some embodiments, a transition of a FM signal from an initial carrier frequency to a final carrier frequency, may be performed by first commencing activation of transmission of a FM signal at the final carrier frequency in a manner as described herein and then commencing deactivation of the FM signal at the initial carrier frequency. As such and depending on the embodiment, such a transition between carrier frequencies may be performed in a correlated manner. Depending on the embodiment, the activation of the FM signal at the final carrier frequency and deactivation of the FM signal at the initial carrier frequency may overlap in time to a predetermined or otherwise determined degree.

Depending on the embodiment, a transition between carrier frequencies may be performed using one or more FM transmitters. For example, an already actively transmitting FM transmitter keeps transmitting until its transmission on the initial carrier frequency is deactivated while another FM transmitter is used to activate a FM transmission on the final carrier frequency. According to some embodiments, a single FM transmitter may be employed to accomplish a carrier frequency, provided the FM transmitter can directly transition between two carrier frequencies, for example an FM transmitter that can support two or more carrier frequencies.

According to some embodiments, a FM transmitter system is configured to manipulate one or more aspects of one or more of its FM signals in order to stimulate a suitably configured external receiver to avoid or tune to a particular FM signal provided by the FM transmitter system without necessarily deactivating the corresponding FM signal entirely. For example, when the FM transmitter system is going to deactivate data transmission via a FM signal at a certain carrier frequency to switch to another carrier frequency. As such the FM transmitter system may seek to maintain high quality of an operative transmission to an external FM receiver. This may be useful in case the FM transmitter system determines interference on one of its FM signals, or it determines positioning in or an anticipated entry into a geographical region wherein one or more instantly used FM channels will no longer be available. Depending on the embodiment, the controller may suppress or cause superposition of noise to a stereo beacon signal, alternative frequencies or other RDS/RDBS signalling embedded in one or more of the FM signals transmitted by the FM transmitter system in order to provide such an incentive.

According to an embodiment, the FM transmitter system is configured to determine anticipated occupations of one or more FM channels in a forward looking manner. For this purpose the controller may be configured to evaluate positional or temporal data associated with the location of the FM transmitter system, velocities with which the FM transmitter system has been or is moving, or EMR records about incoming EMR or inactivity associated with a particular location. Records of corresponding information may be maintained by such a FM transmitter system.

Method of Operating the FM Transmitter System

Figure 2:
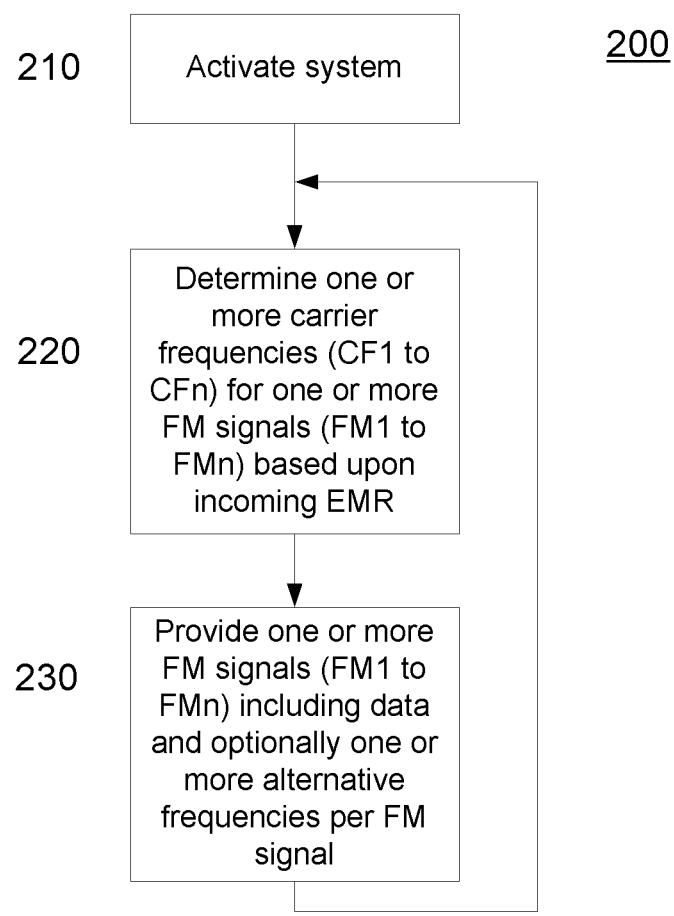
FIG. 2 illustrates a flow diagram of a method for operating a FM transmitter system according to embodiments of the present technology.

FIG. 2 illustrates a flow diagram of a method 200 for operating the FM transmitter system 100 according to embodiments of the present technology. Method 200 outlines, general steps that occur during operation of the FM transmitter system 200. Following activation of the FM transmitter system 100 in step 210, one or more carrier frequencies (CF1 to CFn) for operating one or more of the two or more FM transmitters are determined in step 220. CF1 to CFn are determined based upon the potential for interference between corresponding FM signals and incoming electromagnetic radiation (EMR) as described herein. One or more FM signals (FM1 to FMn) are then provided at the one or more carrier frequencies encoding the data and optionally one or more alternative frequencies in step 230, before the method loops back to the beginning of step 220.

Depending on the embodiment, one or more FM transmitters may be activated (not illustrated) for providing a corresponding FM signal immediately upon determination and provision of corresponding carrier frequencies thereto, delayed until data is provided or until occurrence of other events. Inclusion of an indication of alternative frequencies and/or corresponding FM channels may be optional and occur immediately upon activation of a FM signal, or only when interference with one or more FM signals is determined, or until occurrence of other events, depending on the embodiment.

Depending on the embodiment, once transmission of a FM signal has been activated, the FM transmitter system 100 begins to monitor (not illustrated) the corresponding FM channel used to transmit the FM signal for interference using one or more receivers, while it continues monitoring EMR outside of one or more FM channels that are actively used by the FM transmitter system 100 to maintain information about availability and/or occupancy of unused FM channels using one or more other receivers of the receiver stage 120. As described herein, information indicating FM channel availability and/or occupancy is utilized by the FM transmitter system in one or more ways in order to activate, deactivate, transition and/or maintain transmission of one or more FM signal transmissions, for example. Activation and/or deactivation of one or more carrier frequencies as well as transition between carrier frequencies may be performed in one or more ways as described herein.

Depending on the embodiment, sequences in which one or more of the alternative frequencies and one or more of the carrier frequencies are determined with respect to one another and/or used to operate the FM transmitters may be different. As such, different sequences may be employed during initialization following an energization of the FM transmitter system and/or during active data transmission, for example. Depending on the embodiment, during initialization, a determination of alternative frequencies may be delayed until after determination of carrier frequencies and provision of FM signals until an interference with one or both of the used carrier frequencies occurs. Depending on the embodiment and/or particular operational conditions, one or more of the alternative frequencies may be determined and broadcast via an FM signal right from the beginning of an activation of one or both of the first and second FM transmitters (not illustrated).

Depending on the embodiment, during transition of a FM signal transmission to another carrier frequency, alternative frequencies may be broadcast that only include frequencies other than the one or more carrier frequencies that are actually used to broadcast the alternative frequencies (not illustrated), for example in certain embodiments of FM transmitter systems with two FM transmitters.

Depending on the embodiment, two or more FM signals may be transmitted simultaneously (not illustrated), for example during transitions between carrier frequencies, but also during transition-free periods of operation of the FM transmitter system 100. Depending on the embodiment, simultaneous transmission of multiple FM signals may be considered a normal mode of operation. Other embodiments, however, may transmit only one FM signal during "normal operation".

According to some embodiments, the FM transmitter system 100 may be configured to assume one or more operational conditions associated with one or more power saving modes. Accordingly, such a FM transmitter system may assume one or more particular operational conditions based upon which type of power supply it is operatively coupled with or which operational conditions a user may have preselected. Depending on the embodiment, two or more FM signals may be transmitted simultaneously when the FM transmitter system 100 is operatively connected to a 12V vehicle power outlet, for example Depending on the embodiment, deactivation (not illustrated) of the FM transmitters may be subject to occurrence of one or more events including determination of insufficient or lack of interference free carrier frequencies, termination of provision of data to the FM transmitters, deactivation of the FM transmitter system, corresponding user input or other events, for example.

The technology will now be described with reference to specific examples. It will be understood that the examples are intended to describe aspects of some embodiments of the technology and is not intended to limit the technology in any way.

EXAMPLE 1

Figure 3:
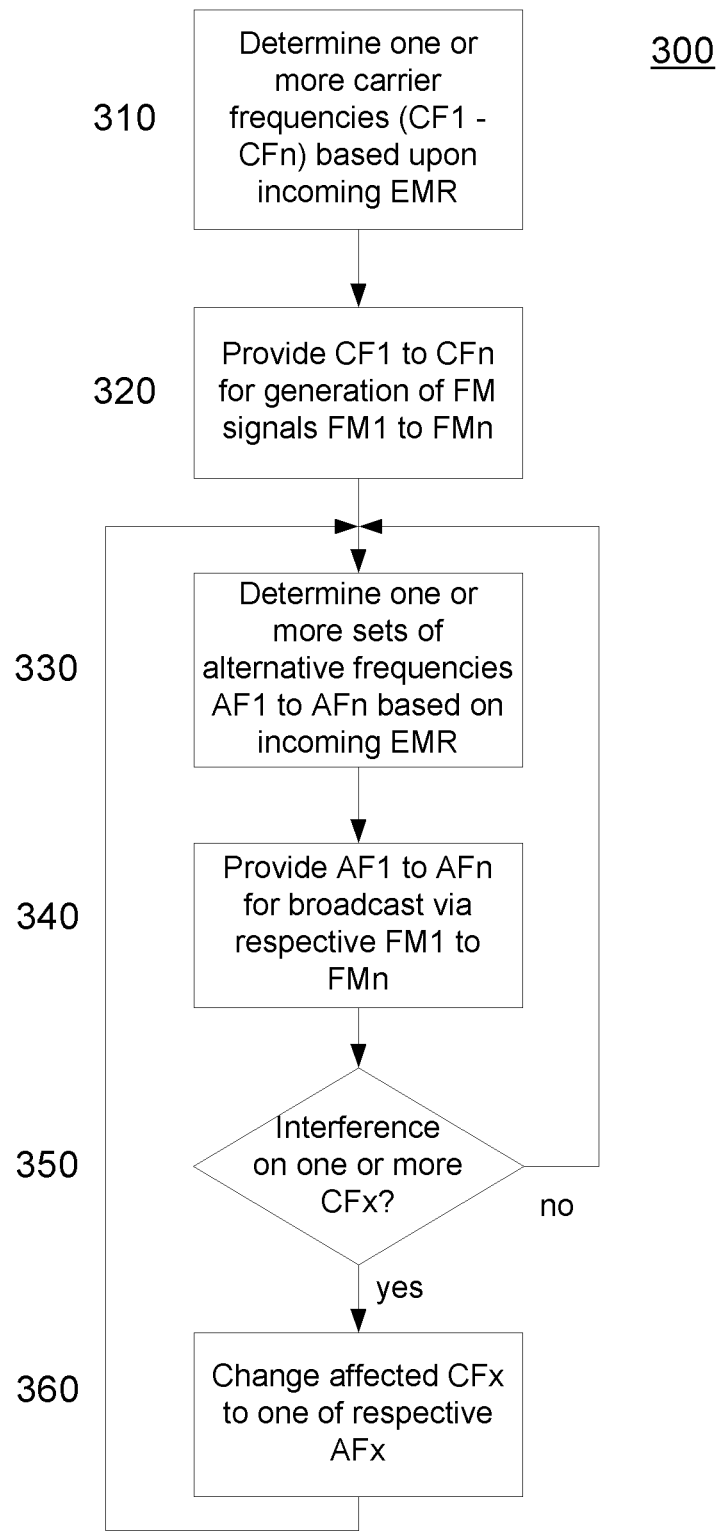
FIG. 3 illustrates a flow diagram of an example method for operating a FM transmitter system according to some embodiments of the present technology.

FIG. 3 illustrates a flow diagram of an example method 300 for operating an FM transmitter system according to some embodiments of the present technology. Method 300 delineates one specific way of operating an example FM transmitter system that includes two or more FM transmitters for transmission of data from a data repository via one or more FM signals. It is noted that in other embodiments, some steps may be performed in sequences deviating from those indicated in FIG. 3. Upon activation (not illustrated), the FM transmitter system determines one or more carrier frequencies (CF1 to CFn) based upon incoming EMR in step 310 so that potential interference between FM signals at CF1 o CFn is limited or avoided. Following the FM transmitter system is configured to provide CF1 to CFn for generation of corresponding FM signals FM1 to FMn to the respective one or more FM transmitters in step 320. Following, the example FM transmitter system begins to monitor (not illustrated) for interference with the one or more FM signals on CF1 to CFn using one or more receivers of the receiver system, and one or more other receivers in order to monitor (not illustrated) EMR outside of the FM channels associated with the CF1 to CFn. Such monitoring may be performed as described herein.

Depending on the embodiment, one or more of the two or more FM transmitters may be activated (not illustrated) immediately upon provision of the respective carrier frequency or activated at a later event. Subsequently, the example FM transmitter system determines and monitors availability of one or more alternative frequencies for each of one or more of the FM signals based on incoming EMR in step 330 and provides respective indications about the one or more alternative frequencies to each of the respective FM transmitters for broadcasting. This particular example FM transmitter system can determine alternative frequencies independently of whether interference has been determined on one or more actively used carrier frequencies. It is noted that other example FM transmitter systems may be configured to determine alternative frequencies only upon occurrence of interference with actively used carrier frequencies or one or more other events, for example.

It is noted that one or more of the FM transmitters may be activated (not illustrated) immediately upon provision of the respective alternative frequencies, until provision of data, or until another event. As noted herein and depending on the embodiment, deactivation (not illustrated) of the FM transmitters may be subject to occurrence of one or more events including determination of insufficient or lack of interference free carrier frequencies, termination of provision of data to the FM transmitters as indicated by corresponding user input, deactivation of the FM transmitter system or other events, for example.

The FM transmitter system determines if there is interference between incoming EMR and one or more of the FM signals FM1 to FMn in step 350. If there is no interference the method loops back to the beginning of step 330. In case there is interference beyond a certain threshold, the method progresses to change the affected carrier frequency to one of its alternative frequencies in step 360 that have already been transmitted. For example, the first carrier frequency is changed to one of the one or more first alternative frequencies. If provided and affected by interference, the second and further carrier frequencies may be changed likewise to become one of the one or more second or further alternative frequencies, if the FM transmitter system determines excessive interference with the second FM signal. Depending on the embodiment, one or more carrier frequencies may be changed substantially simultaneously or within a short period of time, for example. Once the affected carrier frequencies have been changed the method loops back to the beginning of step 330. It is noted that other example FM transmitter systems may be configured to commence transmission of AFs for a particular FM signal only upon determination of interference with the corresponding FM signal. As such, different thresholds may be associated with activation of transmission of AFs and actual commencement of a transition of a particular carrier frequency to one of its AFs.

Depending on the embodiment, if no alternative frequency can be determined, the controller of the FM transmitter system may be configured to deactivate one or more FM transmitters and/or corresponding FM signals. In such a case, the FM transmitter system may be configured to generate a corresponding notification via the user interface. Such a notification may indicate a loss of FM signals, how many signals have been lost, the number of FM signals still available for transmission or other information, for example.

EXAMPLE 2

The example FM transmitter system includes two FM transmitters its own antenna system and a data repository. It is included in a media player and as such shares a common user interface therewith. The example FM transmitter system is configured to activate and maintain FM transmission in response to user input selecting data from the data repository and as further described below with respect to FIG. 4. Deactivation of the FM transmitters is subject to occurrence of one or more events including determination of insufficient or lack of available carrier frequencies, termination of provision of data to the FM transmitters as indicated by corresponding user input, deactivation of the FM transmitter system or other events, for example. The FM transmitters may be mutually coupled to obtain an indication of each other's carrier frequencies directly from one another or via the controller, for example.

The receiver stage of the example FM transmitter system comprises three receivers. Two receivers (first and second receiver) are configured to receive EMR associated with the two FM transmitters and aid in the determination of interference with the corresponding FM signals by the controller. Each of the first and second receivers is configured to monitor EMR associated with one of the FM channels used by the two FM transmitters. The third receiver is configured to receive EMR outside of the two FM channels used by the two FM transmitters and aids in the determination of available FM channels and corresponding candidate alternative frequencies outside of the first and second carrier frequencies by the controller.

Figure 4:
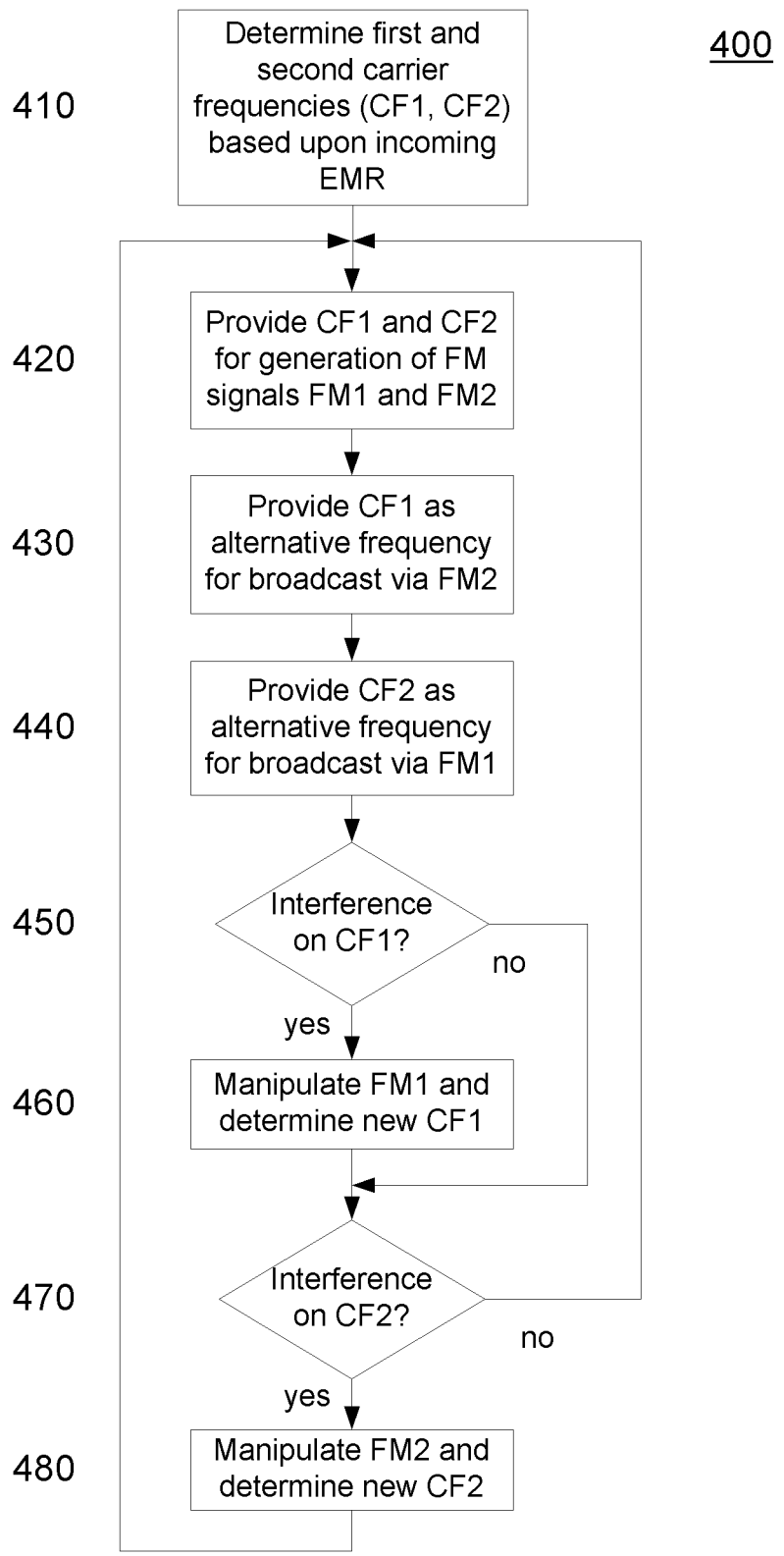
FIG. 4 illustrates a flow diagram of an example method for operating a FM transmitter system according to some embodiments of the present technology.

FIG. 4 illustrates a flow diagram of an example method 400 for operating the instant example FM transmitter system. It is noted that the example FM transmitter system may be operated in a different manner or in a substantially similar manner but with differently configured components or by invoking functions of components of the FM transmitter system in a different manner.

Upon activation (not illustrated), the FM transmitter system determines first and second carrier frequencies (CF1 and CF2) based upon incoming EMR in step 410 so that potential interference between FM signals at CF1 and CF2 is limited or avoided. Following the FM transmitter system is configured to provide CF1 to the first FM transmitter and CF2 to the second FM transmitter for generation of corresponding FM signals in step 420. Each of the FM transmitters of the example FM transmitter system is then activated (not illustrated) by the controller upon provision of its carrier frequency. Following, the example FM transmitter system is configured to begin monitoring for interference with the FM signals at CF1 and CF2 using the first and second receiver (not illustrated). Furthermore, the example FM transmitter system employs the third receiver in order to maintain records of available candidate alternative frequencies, which may later be included in transmitted alternative frequencies within the first and/or second FM signals.

Subsequently, the first carrier frequency of the first FM signal is provided as the alternative frequency to the second FM transmitter in step 430 and the second carrier frequency of the second FM signal is provided as the alternative frequency to the first FM transmitter in step 440. Each FM transmitter is configured to subsequently activate transmission of the provided alternative frequency via a side band associated with its respective FM channel in a digital manner in accordance with corresponding RDS/RDBS standards for the AF function.

The controller subsequently determines, based on information obtained from the first receiver, if the interference between incoming EMR and the first FM signal in step 450 exceeds a predetermined threshold. If that threshold is not exceeded, step 460 is skipped and step 470 is performed. Otherwise, step 460 is performed in which a new candidate first carrier frequency is determined and the first FM signal is manipulated to provide an incentive to an external FM receiver to tune to the second FM channel. The manipulation of the first FM signal can be performed as described herein including complete deactivation of the transmission of the first FM signal.

The controller subsequently determines, based on information obtained from the second receiver, if the interference between incoming EMR and the second FM signal in step 470 exceeds a predetermined threshold. If that threshold is not exceeded, step 480 is skipped and the method loops back to the beginning of step 420. Otherwise, step 480 is performed in which a new candidate second carrier frequency is determined and the second FM signal is manipulated to provide an incentive to an external FM receiver to tune to the first FM channel. The manipulation of the second FM signal can be performed as described herein including complete deactivation of the transmission of the second FM signal.

The method then loops back to the beginning of step 420. Back at step 420, the controller provides the first and second carrier frequencies to the respective FM transmitters, or updates, as the case may be. The FM transmitters then commence or continue to generate respective FM signals at the respective carrier frequencies. It is noted that some of the steps included in this method may be performed partially parallel or overlapping, for example. It is also noted that both carrier frequencies can change to new values substantially simultaneously within the delays due to signal propagation within the FM transmitter system.

As a modification (not illustrated) to this method and in order to avoid substantially simultaneously changing both carrier frequencies, which may cause an external FM radio receiver to lose track of the transmissions from the FM transmitters system, it may be first determined if there is interference on both carrier frequencies and then one of the carrier frequencies may be selected, actually changed and a certain delay set before the other carrier frequency can be changed as well. The one carrier frequency selected for a change before the other may be determined arbitrarily, by sequence of testing, based on a high or low amount of incoming EMR within the associated FM channel, or otherwise, for example. For this purpose, information about availability of FM channels other than the first and second FM channel can be obtained from the third receiver.

Furthermore, the example FM transmitter system may monitor for changes of one or more carrier frequencies and may be configured to halt encoding of data in transmitted FM signals for a certain period of time, for example until at least one FM transmitter has had sufficient time to adopt its new carrier frequency. As such the example FM transmitter system may be configured to buffer data for certain periods of time.

It will be appreciated that, although specific embodiments have been described herein for purposes of illustration, various modifications may be made without departing from the spirit and scope of the invention. In particular, it is within the scope of the invention to provide a computer program product or program element, or a program storage or memory device such as a transmission medium, magnetic or optical wire, tape or disc, or the like, for storing signals readable by a machine, for controlling the operation of a computer according to the method of the invention and/or to structure its components in accordance with the system of the invention.

Further, each step of the methods may be executed on a general computer, such as a personal computer, server or the like and pursuant to one or more, or a part of one or more, program elements, modules or objects generated from any programming language, such as C, C++, Java, Perl, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. An apparatus for transmitting data via frequency modulation (FM) of electromagnetic radiation; the apparatus comprising:
   a. a first FM transmitter configured to transmit a first FM signal on a first FM channel characterized by a first carrier frequency, the first FM signal including the data and optionally an indication of one or more first alternative frequencies (AFs);
   b. a second FM transmitter configured to transmit a second FM signal on a second FM channel characterized by a second carrier frequency, the second FM signal including the data and optionally an indication of one or more second AFs;
   c. a first receiver configured to receive incoming electromagnetic radiation associated with at least one of the first FM channel and the second FM channel;
   d. a second receiver configured to receive incoming electromagnetic radiation at least at one or more frequencies outside of the first FM channel and the second FM channel; and
   e. a controller operatively connected with the first FM transmitter, the second FM transmitter, the first receiver and the second receiver, the controller configured to determine the first carrier frequency and the second carrier frequency based upon incoming electromagnetic radiation; the controller further configured to separately control activation and deactivation of the first FM transmitter and the second FM transmitter.

2. The apparatus according to claim 1 further comprising one or more data interfaces for obtaining at least some of the data via an operative connection with a data repository.

3. The apparatus according to claim 2 wherein the apparatus is included in a media player that comprises the data repository.

4. The apparatus according to claim 2, wherein the data repository is provided by a media player that is external to the apparatus.

5. The apparatus according to claim 1, wherein the first receiver is at least in part controllable by the controller.

6. The apparatus according to claim 1, wherein the second receiver is at least in part controllable by the controller.

7. The apparatus according to claim 1, wherein the data comprises audio data intended for receipt by a receiving device configured to convert the audio data for audible perception by a user.

8. The apparatus according to claim 1, wherein at least one of the first FM signal and the second FM signal include metadata for receipt by a receiving device configured to convert the metadata for display.

9. The apparatus according to claim 1, wherein the data comprises an audio program, and wherein the controller is configured to: monitor the audio program for an opportune break; suspend transmission by the first FM transmitter during said opportune break; and cause the first receiver to measure electromagnetic radiation in a frequency range including the first carrier frequency during said opportune break.

10. The apparatus according to claim 1, wherein the data comprises an audio program, and wherein the controller is configured, upon encountering interference in the first FM channel to: monitor the audio program for an opportune break; and manipulate the first FM signal so as to stimulate an external FM receiver to tune from the first FM channel to the second FM channel during said opportune break.

11. The apparatus according to claim 1, wherein the controller is configured to cause the first receiver to obtain a measurement of total electromagnetic radiation on the first FM channel during transmission of the first FM signal, and to subtract from said measurement an amount of electromagnetic radiation emitted by the first FM transmitter, thereby obtaining a measurement of electromagnetic radiation in the first FM channel due to sources other than the first FM transmitter.

12. The apparatus according to claim 1, wherein the controller is configured to cause an audible instruction to tune a remote FM receiver to a specified frequency, said audible instruction emitted by the apparatus or carried by the data to be emitted by the remote FM receiver.

13. The apparatus according to claim 1, wherein a recovered version of at least a portion of the first FM signal is obtained from electromagnetic radiation received by the first receiver, the controller is configured to compare aspects of the recovered version of said portion of the first FM signal to corresponding aspects of the first FM signal as transmitted by the first FM transmitter, and quality of the first FM channel is determined from said comparison.

14. The apparatus according to claim 1, wherein a recovered version of the data is obtained from electromagnetic radiation received by the first receiver, the controller is configured to compare the recovered version of the data to the data as provided for transmission, and quality of the first FM channel is determined from said comparison.

15. The apparatus according to claim 1, wherein the controller determines the first carrier frequency and the second carrier frequency based upon occurrence of one or more predetermined events including one or more of energization of the apparatus, re-initialization of the apparatus, interference in excess of a predetermined threshold, expiry of a predetermined time interval, occurrence of a predetermined time, and localization of the apparatus within one or more predetermined geographical regions by a geographical localization system for determining the position of the apparatus.

16. A method for transmitting data via frequency modulation (FM) of electromagnetic radiation; the method comprising:
 a. providing at least one of a first FM signal and a second FM signal, the first FM signal associated with a first FM channel characterized by a first carrier frequency, the first FM signal including the data and optionally an indication of one or more first alternative frequencies (AFs); the second FM signal associated with a second FM channel characterized by a second carrier frequency, the second FM signal including the data and optionally an indication of one or more second AFs;
 b. receiving incoming electromagnetic radiation associated with at least one of the first FM channel and the second FM channel;
 c. receiving incoming electromagnetic radiation at least at one or more frequencies outside of the first FM channel and the second FM channel;
 d. determining the first carrier frequency and the second carrier frequency based upon incoming electromagnetic radiation; and
 e. separately controlling activation and deactivation of the first FM transmitter and the second FM transmitter.

17. A computer program product comprising a memory having computer readable code embodied therein, for execution by a CPU, for performing a method for transmitting data via frequency modulation (FM) of electromagnetic radiation; the method comprising:
 a. providing at least one of a first FM signal and a second FM signal, the first FM signal associated with a first FM channel characterized by a first carrier frequency, the first FM signal including the data and optionally an indication of one or more first alternative frequencies (AFs); the second FM signal associated with a second FM channel characterized by a second carrier frequency, the second FM signal including the data and optionally an indication of one or more second AFs;
 b. receiving incoming electromagnetic radiation associated with at least one of the first FM channel and the second FM channel;
 c. receiving incoming electromagnetic radiation at least at one or more frequencies outside of the first FM channel and the second FM channel;
 d. determining the first carrier frequency and the second carrier frequency based upon incoming electromagnetic radiation; and
 e. separately controlling activation and deactivation of the first FM transmitter and the second FM transmitter.

\* \* \* \* \*